Aug. 20, 1929.                 O. B. KIRKPATRICK                 1,725,145
                                STUDENT'S TELEGRAPH
                                 Filed Oct. 3, 1927
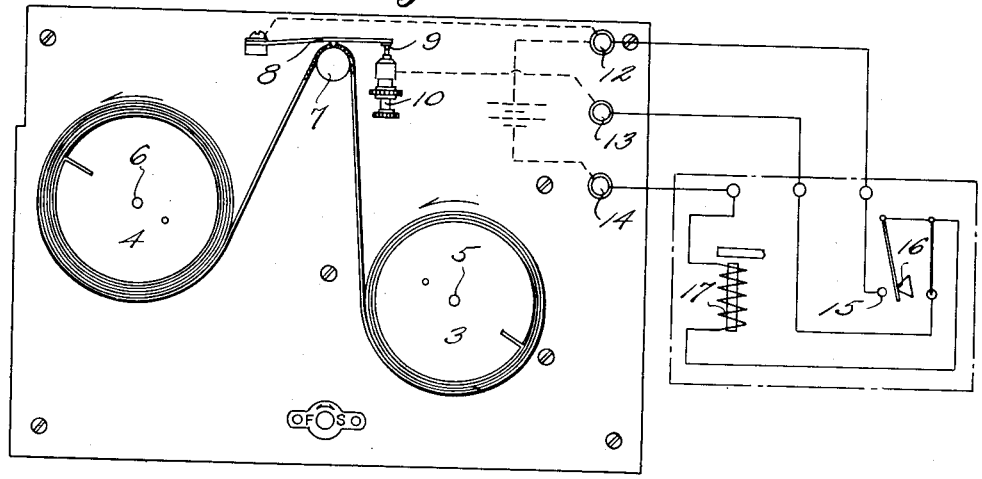
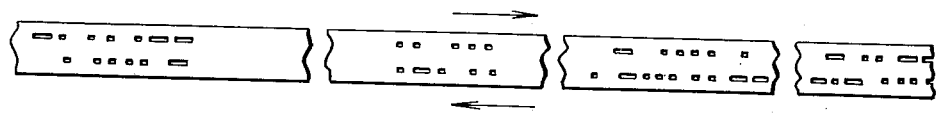
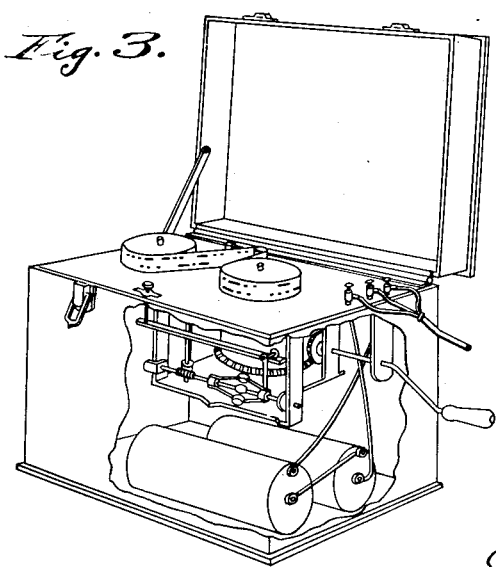
Otto B. Kirkpatrick
INVENTOR
BY Victor J. Evans
ATTORNEY
WITNESS:

Patented Aug. 20, 1929.

1,725,145

UNITED STATES PATENT OFFICE.

OTTO BERNARD KIRKPATRICK, OF CHICAGO, ILLINOIS.

STUDENT'S TELEGRAPH.

Application filed October 3, 1927. Serial No. 223,716.

This invention relates to an outfit for teaching telegraphy to beginners.

Many such devices have heretofore been proposed, but an apparatus of my construction is more conveniently operated and affords greater progress to beginners than machines now available.

An important feature of my invention is an automatic spring operated apparatus for winding and unwinding a tape carrying Morse characters in a plurality of adjacent rows. Passed therethrough is a tape wound on a pair of spools supported on a pair of adjacent spindles which wind or unwind respectively the tape on the reels carrying it over a rounded post on which bears a pointed contact on a spring operated circuit closer adapted to enter the Morse characters perforated in the record and close an electric circuit at a back stop including a telegraphic sounder on the circuit, which will be the duty of the student to imitate. The adjacent records run in sequence along the face of the tape and are arranged in groups so as to form words which are separated by a substantial space between the successive words by which they may be brought into consecutive action by repeatedly releasing the gear train and operating the sounder, for the student to imitate. The sounder is located in close continuity to the machine reproducing the record and within the reach of the student is a telegraph key by which he may in turn operate the sounder to duplicate by his own key a copy of the word or phrase sent by the instrument, and thus give him a line on his proficiency. The Morse characters are arranged in the form of groups of words or phrases, but these groups are arranged in a plurality of rows on the tape from one end to the other one in a direct sequence to the end of the tape and the next one and thence back on the tape in a reversed sequence so that by transposing the spools on the spindles the records may be used over and over again thru mere reversal on the spindles making the tape capable of use as long as desired. The machine is automatic, so as to feed the tape progressively forward under the stylus and may by a simple speed adjustment, permit the rate of delivery of the sounder to be varied to permit greater speed to be gradually acquired.

The sounder is in a branch common to a two-way circuit including the same source of electromotive forces.

The several features of the invention will be more hereinafter described and definitely indicated in the claims appended in this specification.

In the drawings indicating an instrument embodying my improvement.

Figure 1 is a diagram of the instrument embodying my improvement.

Figure 2 is a group of separated sections of a pair of records perforated in accordance with the Morse code on a continuous tape of insulating material.

Figure 3 is an isometric projection of an instrument motor operated for feeding the records.

A perforated tape forms a characteristic feature of my invention and is shown in segment form in Figure 2. Each of these segments bears a word or phrase defined by a plurality of perforations running in sequence along the length of the tape. I preferably use a tape wound on two reels or spools and carrying one or more successive adjacent pairs of records reversely punched with respect to the left and right ends of the records, to the end that the tape may be driven in alternate directions so as to operate the sounder and be successively operated many times. For instance, if the upper record shown in Figure 2 has the Morse letters in sequence from left to right, the adjacent lower one would be punched in sequence from right to left. This is indicated by the arrows adjacent to the upper and lower edge of the tape, the sequence of characters recorded being shown by the direction of the arrows in Figure 2. The tape is wound on two reels 3 and 4, and are placed on a pair of adjacent spindles 5 and 6, driven in identical speed so as to effect the feeding on one spool and unfeeding on the other as indicated in Figure 1.

Another feature of my invention is a blade spring circuit closer which has a point adapted to enter the perforations in the tape and effect a closure of the circuit of a battery and operate a sounder.

The motor is provided with a centrifugal governor by which the speed may be varied. The control spring may be wound by a crank and released by a switch or push button as desired. The tape is drawn down by the action of the motor over a roller or a circular surface 7 permitting a taper point or stylus to enter the perforations of the record under the action of a flat spring carrying a metallic contact 9 at its outer end to engage a cooperating metallic anvil or back stop controlled by an adjusting screw 10 making and breaking a control circuit in accordance with the perforations in the record. When the circuit is made by the stylus bringing contacts 9, 10 together by the tape it passes by way of binding posts 13 on the instrument to the lower end of the magnet of the sounder to post 14 and battery 11 to binding post 12 and thence to the spring controller 8.

This will operate the sounder and by movement of the tape it will progressively deliver the words or phrases to the student. After receiving the message the special wiring of the circuit enables the student to operate the key 16 against the back stop 15 and try to imitate and match the tape sounds for speed and accuracy. My tape should be of considerable length, 100 feet long and when the upper record has been concluded, the reels may be removed from the spindles 5 and 6 and reversely applied to the spindles, and preferably also turned upside down, thereby bringing the lower tape into operative relation to the circuit controller. The spring circuit controller may be pivoted to permit use with any number of records on the tape. It will be apparent that as the reels are reversed and the wound roller is placed in drive shaft 5 that the spindles will be driven in the same direction as before but with reel on the spindle 5. Thus the same pair of reels may be used over and over by the student until he acquires the desired proficiency.

Having thus described my invention, what I claim as new, and desire to secure by Letters Patent is:—

1. A student's telegraph comprising a motor operated gear train, a pair of spindles operated thereby, reels mounted on the spindles, carrying a punched tape with Morse characters cut therein in a plurality of disconnected words or phrases, a curved guide traversed by the tape, a circuit closer operated by the tape having a point bearing on the tape and a contact at its outer end to engage the handle of a circuit closer, a sounder operated by the circuit closer and an independent key to operate the sounder by a common battery.

2. A student's telegraph comprising two reels of perforated insulating tape, having a plurality of holes representing Morse characters arranged in reversed sequence with respect to right and left ends of the record, a spring operated circuit closer, a stylus at an intermediate point of the circuit closer adapted to enter the perforations, a circuit closing contact at the outer end of the circuit closer, and a sounder circuit closed by the contact.

3. A student's telegraph comprising a perforated record tape, means for feeding the same under a stylus, a two-way circuit including a battery and sounder, the stylus being in one branch and a key in the other branch for operating the sounder by the record tape or independently of the record tape.

In testimony whereof I affix my signature.

OTTO B. KIRKPATRICK.